United States Patent
Singh et al.

(10) Patent No.: US 11,777,863 B2
(45) Date of Patent: Oct. 3, 2023

(54) OPTIMIZED ROUTE FOR TIME-CRITICAL TRAFFIC IN MESH NETWORK

(71) Applicant: Landis+Gyr Innovations, Inc., Alpharetta, GA (US)

(72) Inventors: Shobhit Kumar Singh, Ghaziabad (IN); Saurabh Jain, Ghaziabad (IN)

(73) Assignee: Landis+ Gyr Innovations, Alpharetta, GA (US)

( * ) Notice: Subject to any disclaimer, the term of this patent is extended or adjusted under 35 U.S.C. 154(b) by 0 days.

(21) Appl. No.: 17/129,215

(22) Filed: Dec. 21, 2020

(65) Prior Publication Data
US 2022/0200921 A1   Jun. 23, 2022

(51) Int. Cl.
*H04L 47/283* (2022.01)
(52) U.S. Cl.
CPC ................... *H04L 47/283* (2013.01)
(58) Field of Classification Search
CPC ..................................... H04L 47/283
USPC ......................... 709/238; 370/238
See application file for complete search history.

(56) References Cited

U.S. PATENT DOCUMENTS

| | | | | |
|---|---|---|---|---|
| 7,000,031 B2* | 2/2006 | Fischer | ..................... | H04L 1/18 709/248 |
| 7,002,917 B1* | 2/2006 | Saleh | ....................... | H04L 45/32 709/238 |
| 7,093,004 B2* | 8/2006 | Bernardin | ............... | G06F 9/505 709/219 |
| 7,194,543 B2* | 3/2007 | Robertson | .............. | G06Q 30/06 714/39 |
| 7,269,157 B2* | 9/2007 | Klinker | ................... | H04L 47/15 370/228 |
| 8,078,759 B2* | 12/2011 | Seifert | .................. | H04L 67/101 709/246 |
| 8,107,457 B2* | 1/2012 | White | .................... | H04W 76/15 455/442 |
| 8,452,871 B2* | 5/2013 | Ge | ...................... | H04L 41/0622 709/224 |

(Continued)

FOREIGN PATENT DOCUMENTS

WO    2015103538    7/2015

OTHER PUBLICATIONS

International Application No. PCT/US2021/062741, International Search Report and Written Opinion dated Apr. 7, 2022, 12 pages.

*Primary Examiner* — Thu Ha T Nguyen
(74) *Attorney, Agent, or Firm* — Kilpatrick Townsend & Stockton LLP

(57) ABSTRACT

A system for optimizing routes for time-critical messages in a mesh network is provided. For example, a child node in a mesh network can communicate with the root node through any of its parent nodes. The child node is configured to transmit regular data to the root node through a primary route associated with its primary parent. When there is a time-critical message to be transmitted to the root node, the child node estimates a round trip time (RTT) for each route between the child node and the root node. The child node selects, among its parent nodes, a parent node whose associated route has the lowest RTT and transmits the time-critical message to the root node through the selected parent node. After the transmission of the time-critical message, the child node switches back to the primary route to transmit additional regular data to the root node.

19 Claims, 7 Drawing Sheets

(56) References Cited

U.S. PATENT DOCUMENTS

| | | | | |
|---|---|---|---|---|
| 8,880,724 B2* | 11/2014 | Shah | | H04L 41/0668 |
| | | | | 709/239 |
| 10,082,786 B2* | 9/2018 | Sait | | H04L 67/10 |
| 2002/0145981 A1* | 10/2002 | Klinker | | H04L 47/762 |
| | | | | 370/244 |
| 2002/0154639 A1* | 10/2002 | Calvert | | H04L 47/10 |
| | | | | 370/389 |
| 2005/0157660 A1* | 7/2005 | Mandate | | H04L 47/2416 |
| | | | | 370/254 |
| 2006/0056308 A1* | 3/2006 | Gusat | | H04L 45/00 |
| | | | | 370/254 |
| 2007/0110063 A1* | 5/2007 | Tang | | H04L 45/02 |
| | | | | 370/432 |
| 2008/0163229 A1* | 7/2008 | Neuman | | G06F 9/4881 |
| | | | | 718/103 |
| 2008/0212783 A1* | 9/2008 | Oba | | H04L 63/0807 |
| | | | | 380/279 |
| 2008/0291855 A1* | 11/2008 | Bata | | H04W 84/18 |
| | | | | 370/311 |
| 2009/0023453 A1* | 1/2009 | Hu | | H04L 12/189 |
| | | | | 455/452.1 |
| 2009/0067349 A1* | 3/2009 | Glueckman | | H04L 65/1059 |
| | | | | 370/260 |
| 2009/0198832 A1* | 8/2009 | Shah | | H04L 43/10 |
| | | | | 709/239 |
| 2011/0044276 A1* | 2/2011 | Albert | | H04L 1/1887 |
| | | | | 370/329 |
| 2011/0219142 A1* | 9/2011 | Lin | | H04L 43/50 |
| | | | | 709/235 |
| 2011/0267951 A1* | 11/2011 | Stanwood | | H04L 47/2408 |
| | | | | 370/235 |
| 2011/0273287 A1* | 11/2011 | LaLonde | | A61N 1/37211 |
| | | | | 340/539.12 |
| 2012/0013748 A1* | 1/2012 | Stanwood | | H04L 47/2408 |
| | | | | 348/192 |
| 2012/0117268 A1* | 5/2012 | Shaffer | | H04W 40/22 |
| | | | | 709/238 |
| 2013/0021933 A1* | 1/2013 | Kovvali | | H04W 88/18 |
| | | | | 370/252 |
| 2013/0223218 A1 | 8/2013 | Vasseur et al. | | |
| 2014/0006357 A1* | 1/2014 | Davis | | G06F 3/067 |
| | | | | 707/667 |
| 2014/0126423 A1 | 5/2014 | Vasseur et al. | | |
| 2014/0128057 A1* | 5/2014 | Siomina | | H04W 56/00 |
| | | | | 455/423 |
| 2014/0310392 A1* | 10/2014 | Ho | | H04L 67/02 |
| | | | | 709/223 |
| 2015/0195171 A1* | 7/2015 | Mermoud | | G06N 7/005 |
| | | | | 370/253 |
| 2015/0291966 A1* | 10/2015 | Zhang | | C12N 15/63 |
| | | | | 435/320.1 |
| 2015/0319563 A1* | 11/2015 | Johnson | | H04W 40/244 |
| | | | | 455/456.3 |
| 2016/0026542 A1* | 1/2016 | Vasseur | | G06F 11/1464 |
| | | | | 714/4.11 |
| 2016/0381191 A1* | 12/2016 | Marque | | G06F 15/163 |
| | | | | 709/226 |
| 2017/0187594 A1* | 6/2017 | Thubert | | H04L 43/08 |
| 2018/0109852 A1* | 4/2018 | Mandapaka | | H04W 12/033 |
| 2018/0262419 A1* | 9/2018 | Ludin | | H04L 45/24 |
| 2019/0289453 A1* | 9/2019 | Jang | | H04W 8/00 |
| 2019/0297004 A1* | 9/2019 | Fenoglio | | H04W 40/16 |
| 2019/0320494 A1* | 10/2019 | Jayawardene | | H04W 36/08 |
| 2019/0349426 A1* | 11/2019 | Smith | | H04W 12/69 |
| 2020/0396288 A1* | 12/2020 | Zhang | | G06F 3/067 |
| 2021/0135978 A1* | 5/2021 | Nemirovsky | | H04L 45/121 |
| 2021/0157312 A1* | 5/2021 | Cella | | G05B 19/4184 |
| 2021/0356279 A1* | 11/2021 | Szigeti | | G01C 21/3407 |
| 2022/0070922 A1* | 3/2022 | Talarico | | H04W 74/0808 |
| 2022/0108262 A1* | 4/2022 | Cella | | G06Q 10/063118 |
| 2022/0109622 A1* | 4/2022 | Yeh | | H04L 69/22 |
| 2022/0200921 A1* | 6/2022 | Singh | | H04L 45/70 |
| 2022/0210715 A1* | 6/2022 | Deixler | | H04W 40/02 |
| 2022/0386262 A1* | 12/2022 | Liberg | | G01S 5/0236 |
| 2022/0402137 A1* | 12/2022 | Rácz | | B25J 13/006 |
| 2023/0062804 A1* | 3/2023 | Selvanesan | | H04W 76/14 |

* cited by examiner

OPTIMIZED ROUTE FOR TIME-CRITICAL TRAFFIC IN MESH NETWORK

TECHNICAL FIELD

This disclosure generally relates to mesh networks, and more particularly relates to optimizing the routes for time-critical messages in mesh networks.

BACKGROUND

In mesh networks, such as a routing protocol of lossy medium (RPL)-based mesh network, upward routing is performed via a preferred parent, and downward routing is performed by the root node via source routing. A node in the mesh network can choose a parent for routing based on the objective of the mesh network, such as good link quality, low routing cost, etc. Link quality index (LQI) and expected transmission count (ETX) are mostly common attributes in the selection of parents for routing in the lossy mesh network.

Smart grids or other resource distribution networks associated with the mesh networks often require that data reach the headend system in minimum time, so that the corrective measures can be sent to the device. For example, distribution automation (DA) data is very critical and round trip time (RTT) of these data need to be as low as possible. Similarly, outage data should reach the headend system reliably and quickly. However, existing routing mechanisms using objective functions based on LQI or ETX provide reliability but do not guarantee that the RTT of a message is low. Therefore, these existing routing mechanisms are insufficient to handle the routing requirements for time-critical messages.

SUMMARY

Aspects and examples are disclosed for apparatuses and processes for optimizing the routes for time-critical messages in mesh networks. In one example, A mesh network includes a root node, a child node in communication with the root node through other nodes in the mesh network, and a plurality of parent nodes of the child node. Each parent node in the plurality of parent nodes is associated with a route between the child node and the root node that passes through the parent node. The plurality of parent nodes comprise a primary parent node and one or more backup parent nodes. The child node is configured for transmitting regular data to the root node through a primary route associated with the primary parent node, determining that there is a time-critical message to be transmitted to the root node, and estimating a round trip time (RTT) for each route between the child node and the root node that is associated with one of the plurality of parent nodes. The RTTs are estimated based on messages transmitted between the child node and each of the plurality of parent nodes. The child node is further configured for selecting, among the plurality of parent nodes, a parent node whose associated route has the lowest RTT, transmitting the time-critical message to the root node through the selected parent node, and after transmitting the time-critical message to the root node through the selected parent node, transmitting additional regular data to the root node through the primary route.

In another example, a node of a network comprises a processor configured to execute computer-readable instructions, and a memory configured to store the computer-readable instructions that, when executed by the processor, cause the processor to perform operations. The operations comprise transmitting regular data to a root node of the network through a primary route associated with a primary parent node of the node. The node has a plurality of parent nodes in the network comprising the primary parent node and one or more backup parent nodes. Each of the plurality of parent nodes are associated with a route between the node and the root node of the network. The operations further comprise determining that there is a time-critical message to be transmitted to the root node, estimating a round trip time (RTT) for each route between the node to the root node that is associated with one of the plurality of parent nodes. The RTTs are estimated based on messages transmitted between the node and each of the plurality of parent nodes. The operations also comprise selecting, among the plurality of parent nodes, a parent node whose associated route has the lowest RTT, transmitting the time-critical message to the root node through the selected parent node, and switching back to the primary route to transmit additional regular data to the root node.

In yet another example, A method for transmitting time-critical messages in a mesh network includes transmitting, by a node in the mesh network, regular data to a root node of the mesh network through a primary route associated with a primary parent node of the node. The node has a plurality of parent nodes in the mesh network comprising the primary parent node and one or more backup parent nodes. Each of the plurality of parent nodes associated with a route between the node and the root node of the mesh network. The method further includes determining, by the node, that there is a time-critical message to be transmitted to the root node, estimating, by the node, a round trip time (RTT) for each route between the node to the root node that is associated with one of the plurality of parent nodes. The RTTs are estimated based on messages transmitted between the node and each of the plurality of parent nodes. The method also includes selecting, by the node and among the plurality of parent nodes, a parent node whose associated route has the lowest RTT, transmitting, by the node, the time-critical message to the root node through the selected parent node, and switching, by the node, back to the primary route to transmit additional regular data to the root node.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
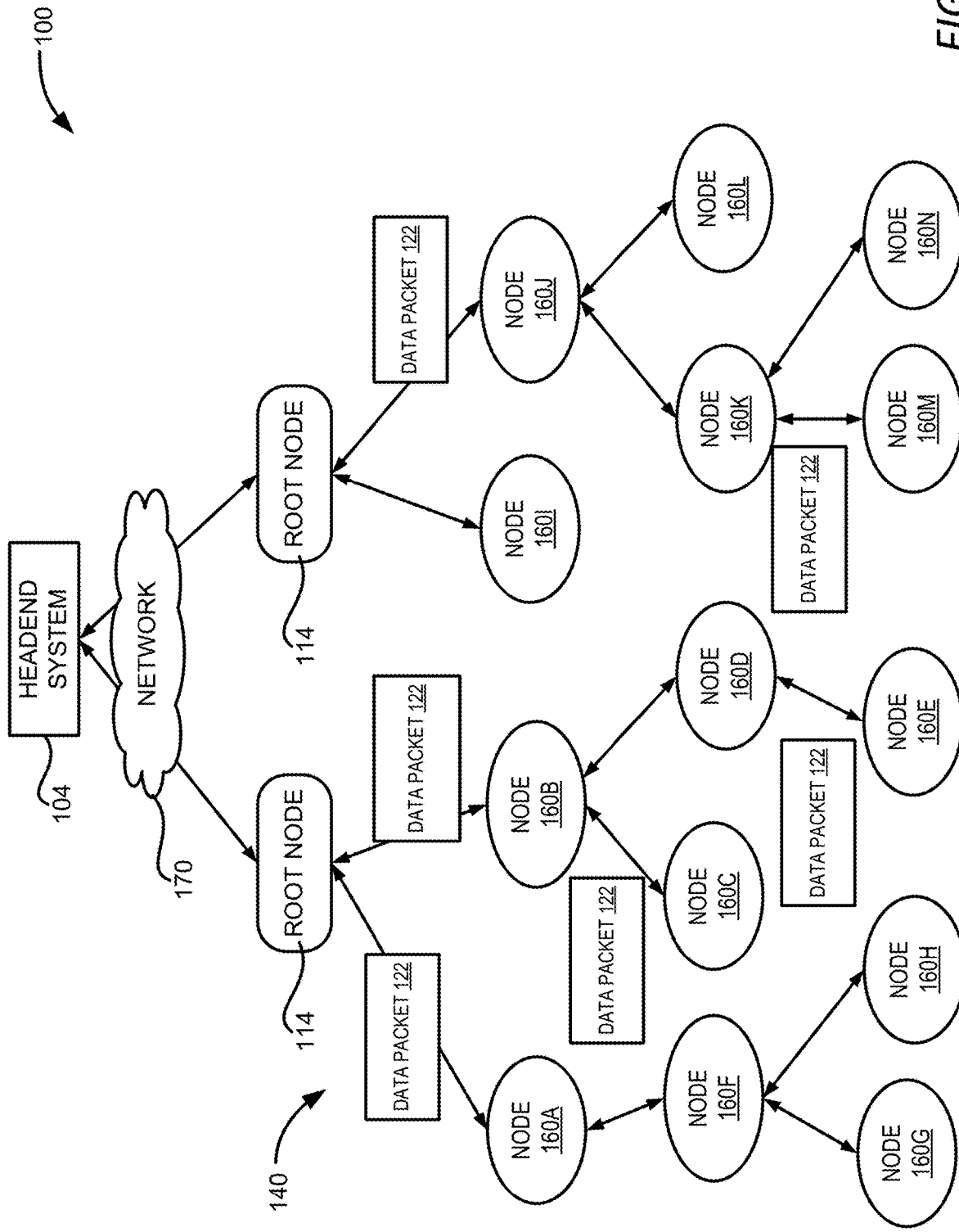
FIG. 1 is a block diagram showing an illustrative operating environment for optimizing the routes for time-critical messages in a mesh network, according to certain aspects of the present disclosure.

Systems and methods are provided for optimizing the routes for time-critical messages in a mesh network. In some examples, a child node in the mesh network has a set of parent nodes and each of the parent node is associated with a route between the child node and a root node of the network. The set of parent nodes include a primary parent node and one or more backup parents. In some examples, the set of parent nodes are selected by the child nodes from its neighboring nodes based on certain criteria, such as the route via a parent node satisfying objective functions based on LQI or ETX. The child node is configured to transmit regular data (e.g., power consumption data in a power distribution network) to the root node through a primary route associated with the primary parent. When the child node determines that there are time-critical messages (also referred to as "critical messages"), such as DA data or outage data, to be transmitted to the root node, the child node may choose the route based on the round trip time (RTT) maintained by the child node for each route associated with one parent node in the set of parent nodes.

The child node also estimates and updates the RTT for each route from time to time. For example, the child node can estimate the RTT when communicating with the root node, such as by sending a unicast message (e.g., a destination advertisement object message or any upward unicast message for which an acknowledgement is expected) to the root node and receiving the acknowledgement from the root node. The child node can record the time when transmitting the message through each parent node to the root node and the time when receiving the acknowledgement message through the respective parent node. The difference between the transmitting time and the receiving time through a given parent node can be determined as the RTT for the route associated with the parent node. The child node can transmit the unicast message on a regular basis, such as every hour. The intermediate nodes on a route from the child node to the root node can also use the difference between the forwarding time of the unicast message and the receiving time of the acknowledgement message to estimate the RTTs for the route between the respective intermediate nodes and the root node.

In another example, a child node can estimate the RTT through communications between the child node and each of its parent node. For instance, for a given parent node, the child node can determine the RTT between the child node and the parent node through message exchanges between these two nodes. The child node can further obtain the RTT for the route between this parent node and the root node via control messages received from the parent node. In the control message, the parent node can insert the RTT of the route from the parent node to the root node. In this way, the child node can calculate the RTT from the child node to the root node by summing up the RTT of the route between the child node and the parent node and the RTT of the route between the parent node and the root node.

Based on the calculated RTT between the child node and the root node through different parent nodes, the child node selects the parent node (primary parent node or alternative parent node) whose associated route has the lowest RTT or using the RTT as a parent selection factor. The child node transmits the critical message to the selected parent node which further forwards the critical message to the root node through its associated route. The child node then switches back to the primary route and continues to transmit the regular data to the root node through the primary route.

Techniques described in the present disclosure reduces the latency of transmitting the time-critical messages to the root node. This allows the urgent issues of the mesh network or the associated resource distribution network to be addressed quickly. Further, by selecting the route with the lowest RTT, the power consumption for transmitting the time-critical messages is reduced. For instance, due to the low RTT, the child node can receive the acknowledgement of the time-critical message in a shorter time period, and thus the child node can enter the sleep mode earlier leading to reduced wake time of the child node. Also, the route having the lowest RTT typically has a smaller number of hops. As a result, fewer nodes are involved in transmitting the time-critical messages and the overall power consumption of the network for transmitting the critical message is reduced.

Exemplary Operating Environment

FIG. 1 shows an illustrative operating environment 100 for optimizing the routes for time-critical messages in a mesh network. The operating environment 100 includes a mesh network 140 in which nodes are configured to select an optimized route when transmitting time-critical messages. The mesh network 140 shown in FIG. 1 includes multiple nodes 160A-160N (which may be referred to herein individually as a node 160 or collectively as the nodes 160). The nodes 160 may include measuring nodes for collecting data from the respective deployed location of the nodes, processing nodes for processing data available to the nodes, router nodes for forwarding data received from one node to another node in the network 104, or nodes that are configured to perform a combination of these functions. The nodes 160 are further configured to communicate with each other so that data packets 122 containing messages or other data can be exchanged between the nodes 160.

In one example, the mesh network 104 can be associated with a resource distribution network, such as a utility network, to deliver measurement data obtained in the resource distribution network. In this example, the nodes 160 can include meters such as electricity meters, gas meters, water meters, steam meters, and any other type of Internet of things (IoT) devices. and be implemented to measure various operating characteristics of the resource distribution network, such as the characteristics of resource consumption. In a power distribution network, example characteristics include, but are not limited to, average or total power consumption, the peak voltage of the electrical signal, power surges, and load changes. The nodes 160 transmit the collected data through the mesh network 104 to, for example, a root node 114.

A root node 114 of the network 140 may be configured for communicating with the nodes 160 to perform operations such as managing the nodes 160, collecting data from the nodes 160, and forwarding data to a headend system 104. A root node 114 can also be configured to function as a node to measure and process data itself. The root node 114 may be a personal area network (PAN) coordinator, a gateway, or any other device capable of communicating with the headend system 104. The root node 114 ultimately transmits the generated and collected data to the headend system 104 via another network 170, such as the Internet, an intranet, or any other data communication network. The headend system 104 can function as a central processing system that receives streams of data or messages from the root node 114. The headend system 104, or another system associated with the utility company, can process or analyze the collected data for various purposes, such as billing, performance analysis, or troubleshooting.

It should be appreciated that while FIG. 1 depicts a specific network topology (e.g., a destination oriented directed acyclic graph (DODAG) tree), other network topologies are also possible (e.g., a ring topology, a mesh topology, a star topology, etc.). It should be further understood that the topology in FIG. 1 shows the primary route used by each node to transmit data packets 112. As will be discussed in detail in the following, each node 160 can maintain a list of parent nodes each associated with a different route. When transmitting a time-critical message, a node 160 may examine these different routes in terms of their associated RTT and select a route having the lowest RTT for transmission. The selected route may be the same or different from the primary route shown in FIG. 1.

Figure 2A:
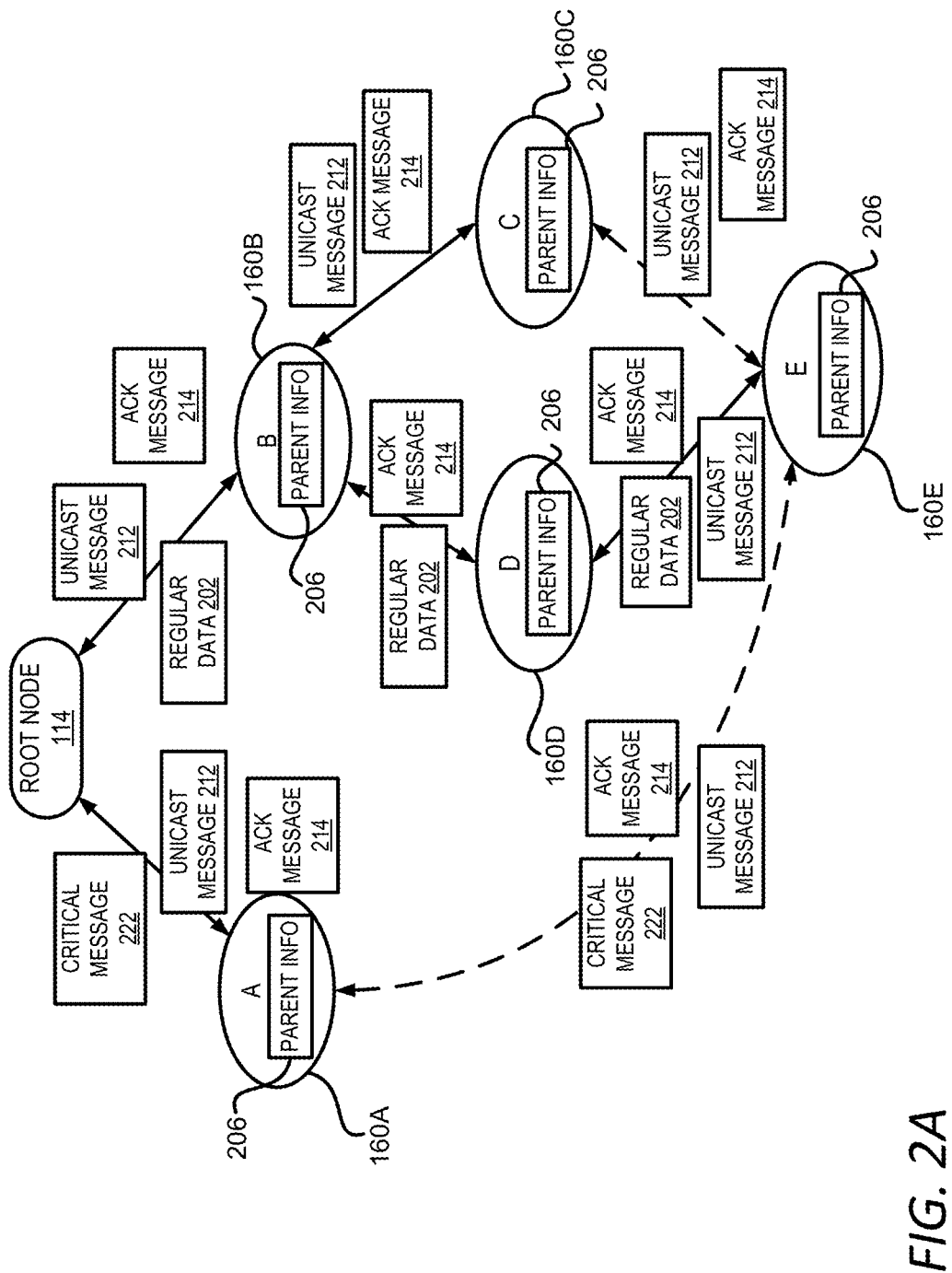
FIG. 2A shows an example hierarchy of nodes in the mesh network and interactions between these nodes to estimate the RTT of a route between a child node and the root node, according to certain aspects of the disclosure.

FIG. 2A shows an example of the mesh network hierarchy of nodes 160 in the mesh network 140 and interactions of the nodes 160 to estimate the RTT between the respective nodes 160 and the root node 114, according to certain aspects of the disclosure. In the following, a child node refers to any node 160 in the mesh network 140 that has at least one parent node. In the example shown in FIG. 2A, a child node E can send data to the root node 114 through its parent nodes A, D, or C. Node A is in direct communication with the root node 114, and nodes D and C can communicate with the root node 114 through their parent node B. The child node E has earlier determined that node D is its primary parent (e.g., based on objective functions defined using LQI or ETX). As such, the route associated with the primary node D (i.e., the route from node E to root node 114 via nodes D and B) is the primary route for transmitting regular data 202, such as the measurement data obtained at the child node E or other data that are not time critical. Nodes A and C are backup parent nodes of the child node E.

If the child node E determines that there is a time-critical message 222 to be sent to the root node 114, the child node E can evaluate the RTT of the route associated with each of its parent nodes, i.e., nodes A, C, and D in this example, to find the route having the lowest RTT. The time-critical message 222 can be any message that the child node E determines that it should be sent to the root node 114 as soon as possible. In other words, for a time-critical message 222, low latency has a higher priority than other objectives, such as routing cost or link quality. The time-critical message 222 can be a message indicating an issue associated with the resource distribution network or the mesh network. For example, the issue can be an outage in a certain area of the resource distribution network, such as a power outage in a smart grid. The time-critical message 222 can also include a message indicating an issue or a malfunction associated with devices in the resource distribution network or the mesh network. For instance, if a critical device of the power distribution device stops functioning, a time-critical message 222 can be generated by the child node E and sent to the root node 114. If the time-critical message 222 can be sent to the root node 114 with low latency, the root node 114 can forward it to a system associated with an entity (e.g., a utility) that is responsible for addressing the issue indicated in the time-critical message 222 and have the problem resolved quickly.

To determine the route having the lowest RTT, the child node E can maintain parent information 206 that contains a list of RTTs for routes associated with the respective parent nodes. The child node E can calculate and update these RTTs from time to time. For example, the child node E can calculate the RTT for a route associated with a parent node using a unicast message 212 sent by the child node E to the root node 114 through the parent node. The child node E can record the timestamp of transmitting the unicast message 212 and the timestamp of receiving an acknowledgement message 214 of the unicast message 212. The RTT for this route can be determined as the difference between these two timestamps. In this way, the RTT of different routes associated with different parent nodes can be calculated. Further, each of the intermediate nodes along the respective routes can also record the timestamps of forwarding the unicast message 212 and receiving the corresponding acknowledgement message 214, and calculate the RTT of the corresponding route observed at the intermediate node.

The unicast message 212 can be any unicast message sent from the child node E through the selected parent to the root node 114 that requires the root node 114 to respond back. For example, the unicast message 212 can be a ping message to the root node 114. If the mesh network 140 is configured to implement the routing protocol of lossy medium (RPL), the unicast message 212 can include a destination advertisement object (DAO) message. The DAO message is used to propagate destination information upward along the mesh network 140. In non-storing mode, the DAO message is unicast to the root node 114. The DAO message may be acknowledged by its destination with a destination advertisement acknowledgement (DAO-ACK) message back to the sender of the DAO.

In order to calculate the RTT for each route, node E can send a DAO message 212 through every parent at a regular interval determined based on DAO frequencies in the mesh network 140. For each of the DAO message, the root node 114 sends the DAO-ACK message 214 back to node E along the same route used for sending the DAO message 212. After receiving the DAO-ACK message, node E calculates the RTT of each route as the difference between the transmitting time and the receiving time as described above. This RTT can be updated each time the DAO message is sent and the DAO-ACK message is received.

In some implementations, the originating node, node E in this example, can add a sequence number in an IPv6 extension header or a hop-by-hop (HBH) option in the DAO message such that it can be uniquely identified in the network. For example, a new IPv6 extension header can be added to include the sequence number. The new IPv6 extension header can be defined in a type-length-value (TLV) format used to transmit optional data as follows:

Extension header Type (1 byte)—New value can be defined and registered with Internet Assigned Numbers Authority (IANA).

Header Extension Length—1 byte

Sequence Number—2 bytes

Alternatively, or additionally, the sequence number can be added to the HBH options of IPv6 header. The HBH option format is listed as follows:

Option Type

Bit 7 and 6=0x00 indicates skip this option if node does not recognize

Bit 5 to 0=a new option type.

Option Data Len—1 byte

Option Data—2 byte sequence number

Node E can generate a random number as the starting number of the sequence number, and for subsequent DAO messages, the sequence number will increment in serial order.

By using the sequence number, the intermediate nodes en-route to the root node 114 can examine the extension header (the new IPv6 extension header or the HBH option of the existing IPv6 extension header) and store information in the extension header along with the timing information. In some examples, an intermediate node stores the sequence number of the DAO message and the IP address of the source node (node E in this example), the combination of which can uniquely identify the DAO message on the network.

When sending back the DAO-ACK message, the root node 114 can attach the source routing header to the packet so that the same sequence number is inserted in the extension header of the DAO-ACK message. Each intermediate node receiving the DAO-ACK message (e.g., node A, node B, node C, or node D) can record the timestamp of receiving the message. The intermediate node can further match the sequence number and the IP address of the source node included in the DAO-ACK message with what the intermediate node has previously recorded to find the corresponding timestamp for transmitting the DAO message. The intermediate node can thus calculate the RTT for the corresponding route as the difference between the time indicated by the timestamp of receiving the DAO-ACK message and the time indicated by the timestamp of transmitting the DAO message.

By configuring an intermediate node to calculate the RTT of its route to the root node using messages of a source node, the number of messages transmitted in the mesh network 140 can be reduced, because the intermediate node can reduce the number of its unicast messages for RTT estimation. This reduces the network bandwidth consumption and also the computation resource consumption at the intermediate node. In addition, the technology presented above is backward compatible. Nodes 160 in the mesh network 140 that do not understand the new IPv6 extension header or the HBH options proposed above can ignore the information in those fields and function as normal. Note that other mechanisms can also be used to add sequence number in packet in addition to that described above. Further, the packets can be packets other than the DAO message.

Referring back to FIG. 2A, based on the maintained RTTs for routes associated with different parent nodes, child node E selects the route having the lowest RTT to transmit the time-critical message 222. In the example shown in FIG. 2A, the route associated with parent node A has the lowest RTT and thus child node E transmits the time-critical message 222 through parent node A. After receiving the acknowledgement of the time-critical message 222 from the root node 114, node E can enter into a sleep mode if there is no other data to transmit. If there are additional regular data 202 for transmission, the child node E can switch back to its primary route (route associated with primary parent node D in FIG. 2A) for transmitting regular data 202.

Figure 2B:
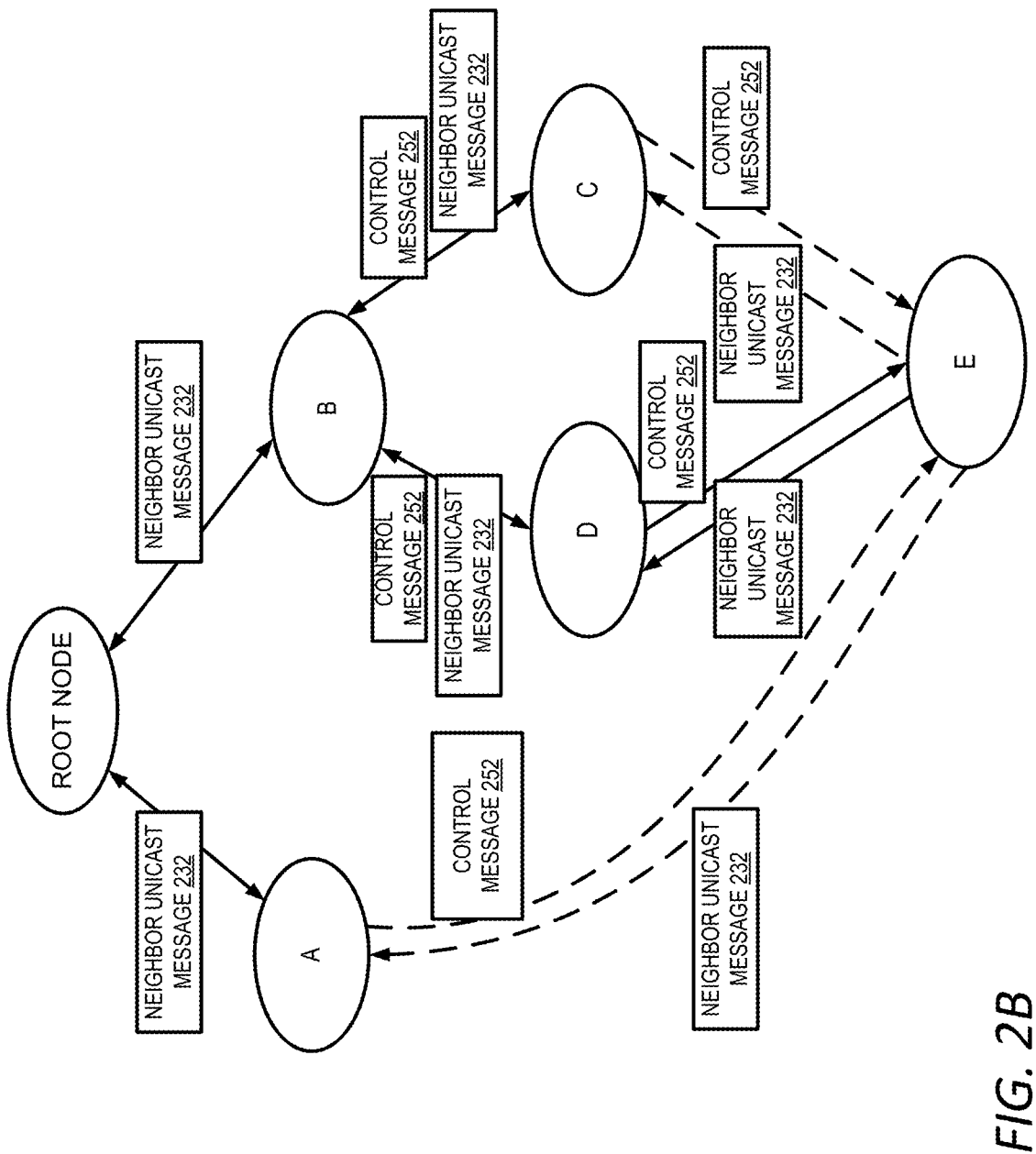
FIG. 2B shows another example of interactions between nodes in the mesh network to estimate the RTT of a route between a child node and the root node, according to certain aspects of the disclosure.

FIG. 2B shows another example of calculating the RTTs for different routes of a child node, according to certain aspects of the disclosure. The mesh network hierarchy of nodes shown in FIG. 2B is the same as that in FIG. 2A, where child node E has three parent nodes, nodes A, D, and C. Node D is the primary parent and used to route the regular data 202. Node A and node C are backup parent nodes. To calculate the RTTs of the various routes from node E to the root node 114, node E can calculate the RTT of the route between the node E and each of the parent nodes A, C, and D. The RTT from a child node to its parent node i can be denoted as $RTT_{node\_parent_i}$, where i=1, . . . , N and N is the total number of parent nodes. Node E further obtains the RTT of the route from each of the parent nodes to the root node 114. The RTT from the parent node i to the root node 114 can be denoted as $RTT_{parent_i\_root}$. The sum of the two RTTs related to the same parent node i can provide the RTT from the node E to the root node 114 through the parent node i, i.e., $RTT_{node\_parent_i\_root} = RTT_{node\_parent_i} + RTT_{parent_i\_root}$.

To calculate $RTT_{node\_parent_i}$, i=1, . . . , N, node E can send a neighbor unicast message 232 to each of its parent nodes, nodes A, C, and D in the example shown in FIG. 2B, and record the timestamp of sending the message. When receiving the response from a corresponding parent node, node E records the timestamp of receiving such a response. Node E can further calculate the RTT between node E and the corresponding parent node, $RTT_{node\_parent_i}$, as the difference between the time specified in the second timestamp and the first timestamp. The neighbor unicast message 232 can be a neighbor discovery message, such as a neighbor unreachability detection (NUD) message. The neighbor unicast message 232 can be a MAC layer packet or an IP layer packet. If the MAC layer acknowledgement packet is used to calculate the $RTT_{node\_parent_i}$, the RTT needs to be measured from the first MAC packet sent and includes all the retries. If IP reply is used to calculate the $RTT_{node\_parent_i}$, node E stores details such as transmission time and packet details, and calculates the RTT once the IP reply is received.

The RTT from the parent node i to the root node 114, $RTT_{parent_i\_root}$, can be obtained from the parent node i through a control message 252. For instance, parent node i, after calculating its RTT to root node 114, can insert the $RTT_{parent_i\_root}$ into a control message 252 sent to its child nodes. In some examples, the $RTT_{parent_i\_root}$ inserted into the control message 252 is the RTT for a route from the parent node i to the root node 114 through a primary parent node of the parent node i (i.e., the primary route of the parent node i). The $RTT_{parent_i\_root}$ can be the latest RTT calculated by the parent node i or an averaged value of the RTTs calculated by the parent node i over a predetermined period of time. The control message can be, for example, a DODAG information object (DIO) message if the mesh network 140 is configured to implement the RPL protocol. The parent node i broadcasts the DIO message to its child nodes so that the child nodes can maintain the information of the parent node i. As such, by adding the $RTT_{parent_i\_root}$ in the DIO message, a child node of the parent node i can receive the $RTT_{parent_i\_root}$ which enables the child node to calculate its RTT to the root node 114 through parent node i as $RTT_{node\_parent_i\_root} = RTT_{node\_parent_i} + RTT_{parent_i\_root}$.

To add the RTT information to the DIO message, a new option can be added to the DIO message. According to the RPL, DIO message may carry valid options. The RPL specification allows for the DIO message to carry the following options:

0x00 Pad1
0x01 PadN
0x02 DAG Metric Container
0x03 Routing Information
0x04 DODAG Configuration
0x08 Prefix Information A new option, RTT option, can be added and defined in the TLV format like other options as follows:

Option Type
Bit 7 and 6=0x00 indicates skip this option if node does not recognize
Bit 5 to 0=a new option type.
Opt Data Len—1 byte
Option Data—4 bytes Time Value In some examples, the value of RTT can be expressed in milliseconds. Note that the nodes in mesh network 140 need to understand this new option in order to obtain the RTT information.

In the example shown in FIG. 2B, node A can calculate its RTT to the root node 114, denoted as $RTT_{A\_root}$, through a MAC layer or IP layer packet to root node 114 as described above. Upon receiving the MAC layer acknowledgment or the IP layer reply, node A can calculate $RTT_{A\_root}$ by calculating the time difference between receiving the response and sending the neighbor unicast message. Node B can calculate its RTT to the root node 114 $RTT_{B\_root}$ in a similar way. Node A and node B can then transmit the $RTT_{A\_root}$ and $RTT_{B\_root}$ to their respective child nodes through the DIO message or other control message 252 as discussed above.

Node D and node C can calculate their respective RTTs to node B, $RTT_{D\_B}$ and $RTT_{C\_B}$ in a similar way as node A by sending respective neighbor unicast messages 232 to node B. Node D can then calculate its RTT to the root node 114 as $RTT_{D\_B\_root}=RTT_{D\_B}+RTT_{B\_root}$. Likewise, node C can calculate its RTT to the root node 114 as $RTT_{C\_B\_root}=RTT_{C\_B}+RTT_{C\_root}$. Node D and node C can send the calculated RTT to their respective child nodes through a control message 252 as described above.

Through the received control messages 252 from different parent nodes, node E can obtain the RTT from each of its parent nodes to the root node 114, including $RTT_{A\_root}$ for parent node A, $RTT_{D\_B\_root}$ for parent node D, and $RTT_{C\_B\_root}$ for parent node C. Node E can obtain the RTT from itself to each of these parent nodes through a neighbor unicast message 232 to each of the parent nodes. Based on the received responses to these neighbor unicast messages 232, node E can calculate the RTTs from itself to each of the parent nodes: $RTT_{E\_A}$, $RTT_{E\_D}$, and $RTT_{E\_C}$. Node E can further calculate its RTT to the root node 114 via each of its parent nodes as follows:

$$RTT_{E\_D\_root}=RTT_{E\_D}RTT_{D\_root};$$

$$RTT_{E\_C\_root}=RTT_{E\_C}RTT_{C\_root};$$

$$RTT_{E\_A\_root}=RTT_{E\_A}RTT_{A\_root};$$

It should be understood that although the above examples focus on the child node E, the operations described above may be performed by any node 160 in the mesh network 140 (such as node D or node C) that is configured to transmit data to the root node 114 through one of its parent nodes. Each of these nodes 160 can likewise maintain parent information 206 for their respective parent nodes including the RTT associated with each route through the respective parent nodes.

In addition, while the above disclosure describes that a route with the lowest RTT is selected for the time-critical message 222, the low RTT does not guarantee a reliable route. As such, in some examples, when selecting the best route for the time-critical message 222, the reliability of the route is also considered. In doing so, the node sending the time-critical message 222 can use any method available to determine a set of candidate parent nodes associated with reliable routes for sending the time-critical message 222. The method for selecting reliable routes can be based on, for example, Minimum Rank with Hysteresis Objective Function (MRHOF) function, LQI/ETX based objective functions, or any other mechanism defined for wireless routing. Once the set of candidate parents is selected based on the reliability criteria, RTT criteria can be applied to the set of candidate parents. The time-critical message 222 that needs low response time can be transmitted from the node through the parent with the lowest RTT.

Figure 3:
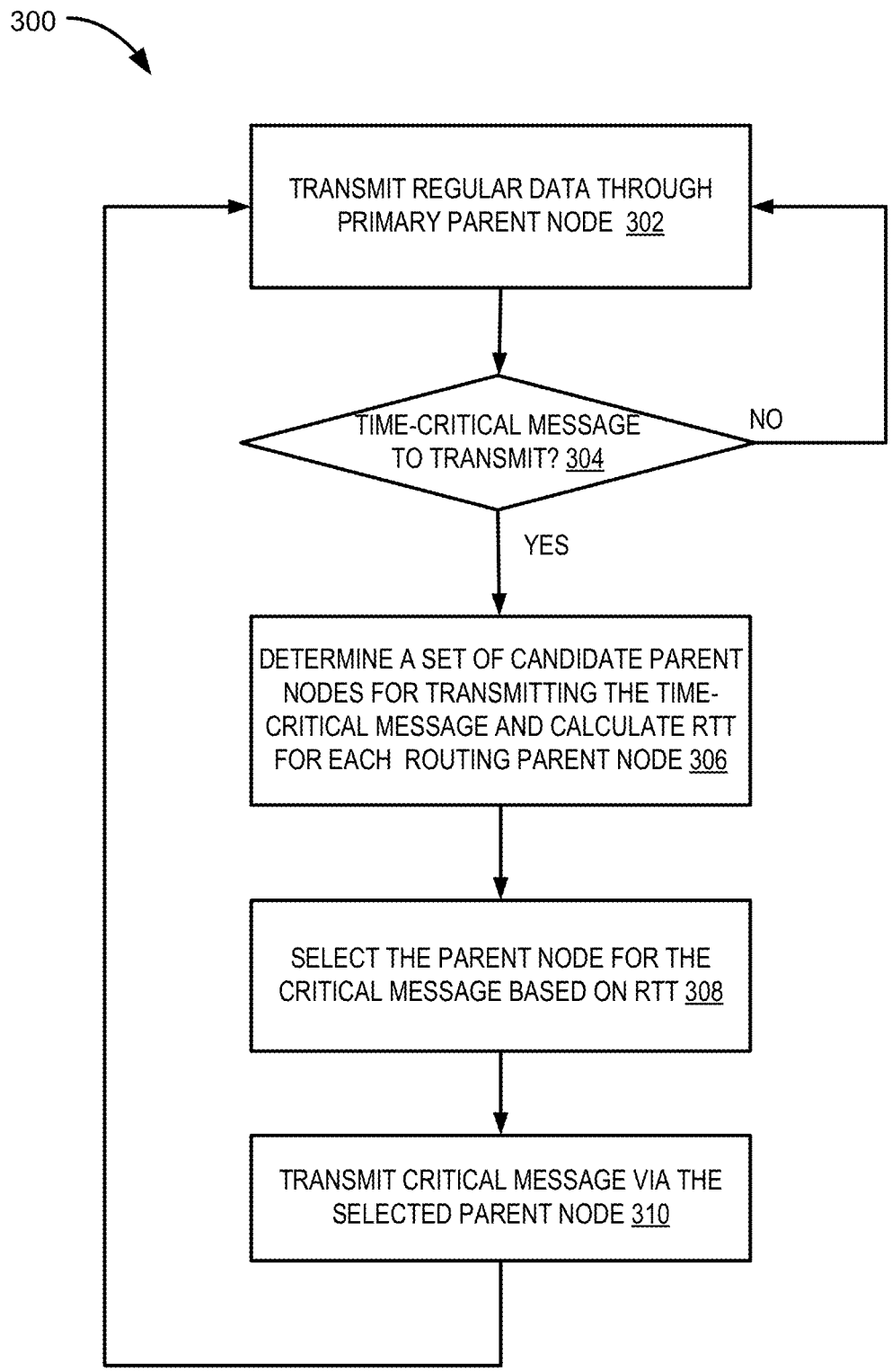
FIG. 3 shows an example of a process for optimizing the routes for time-critical messages in a mesh network, according to certain aspects of the disclosure.

FIG. 3 shows an example of a process 300 for optimizing the routes for time-critical messages 222 in a mesh network 140, according to certain aspects of the disclosure. Any node 160 in the mesh network 140 that is configured to transmit data to the root node 114 through one of its parent nodes (e.g., node E, node D, or node C in FIGS. 2A and 2B) can implement operations depicted in FIG. 3 by executing suitable program code. For illustrative purposes, process 300 is described with reference to certain examples depicted in the figures. Other implementations, however, are possible.

At block 302, the process 300 involves a node 160 transmitting regular data 202 through a primary parent node of the node 160. The primary parent node has been previously selected by the node 160 based on objectives such as LQI or ETX. The regular data 202 can include, for example, measurement data obtained at the node 160 or other data that are not time critical.

At block 304, the process 300 involves the node 160 determining that a time-critical message 222 is to be transmitted. The time-critical message 222 can be any message that the node 160 determines that it should be sent to the root node 114 as soon as possible. For example, the time-critical message 222 can be a message indicating an issue in the mesh network 140 or the resource distribution network associated with the mesh network 140. For example, the issue can be an outage in a certain area of the resource distribution network, such as a power outage in a smart grid. The time-critical message 222 can also include a message indicating an issue or a malfunction associated with devices in the resource distribution network or the mesh network. For instance, if a critical device of the power distribution device stops functioning, a time-critical message 222 can be generated and should be sent to the root node 114 by the node 160 as soon as possible so that the issue can be addressed quickly.

If the node 160 determines that there is no time-critical message 222 to be transmitted, the node 160 continues to transmit the regular data 202 through its primary parent node. If the node 160 determines that there is a time-critical message 222 to be transmitted, the process 300 involves, at block 306, determining a set of candidate parent nodes for transmitting the time-critical message 222 and calculating the RTT of each route associated with these candidate parent nodes. In some examples, the node 160 can determine the set of candidate nodes using any method available for determining reliable routes, such as methods based on Minimum Rank with Hysteresis Objective Function (MRHOF) function, LQI/ETX based objective functions, or any other mechanism defined for wireless routing. For instance, the set of candidate parent nodes can be selected as those whose associated routes have an objective measurement, such as the reliability, higher than a pre-determined threshold or ranked the highest among the available routes. For each parent node in the set of candidate parent nodes, the node 160 determines or calculates the RTT of the route from the node 160 to the root node 114 via the parent node. Details on calculating the RTT of the routes associated with the parent nodes of the node 106 are provided below with respect to FIGS. 4 and 5.

At block 308, the node 106 selects the parent node from the set of candidate parent nodes for transmitting the time-critical message 222. In examples, the node 106 selects the parent node that is associated with a route having the least RTT as the parent node for forwarding the time-critical message 222. At block 310, the process 300 involves the node 106 transmitting the time-critical message 222 via the selected parent node. In some implementations, the node 106 waits for the acknowledgement of the time-critical message 222 from the root node 114 before proceeding to the next operation. After the acknowledgement is received, the node 106 can enter a sleep mode if there is no other message to transmit, to switch back to the primary route and continue to transmit the regular data 202 through the primary route.

Figure 4:
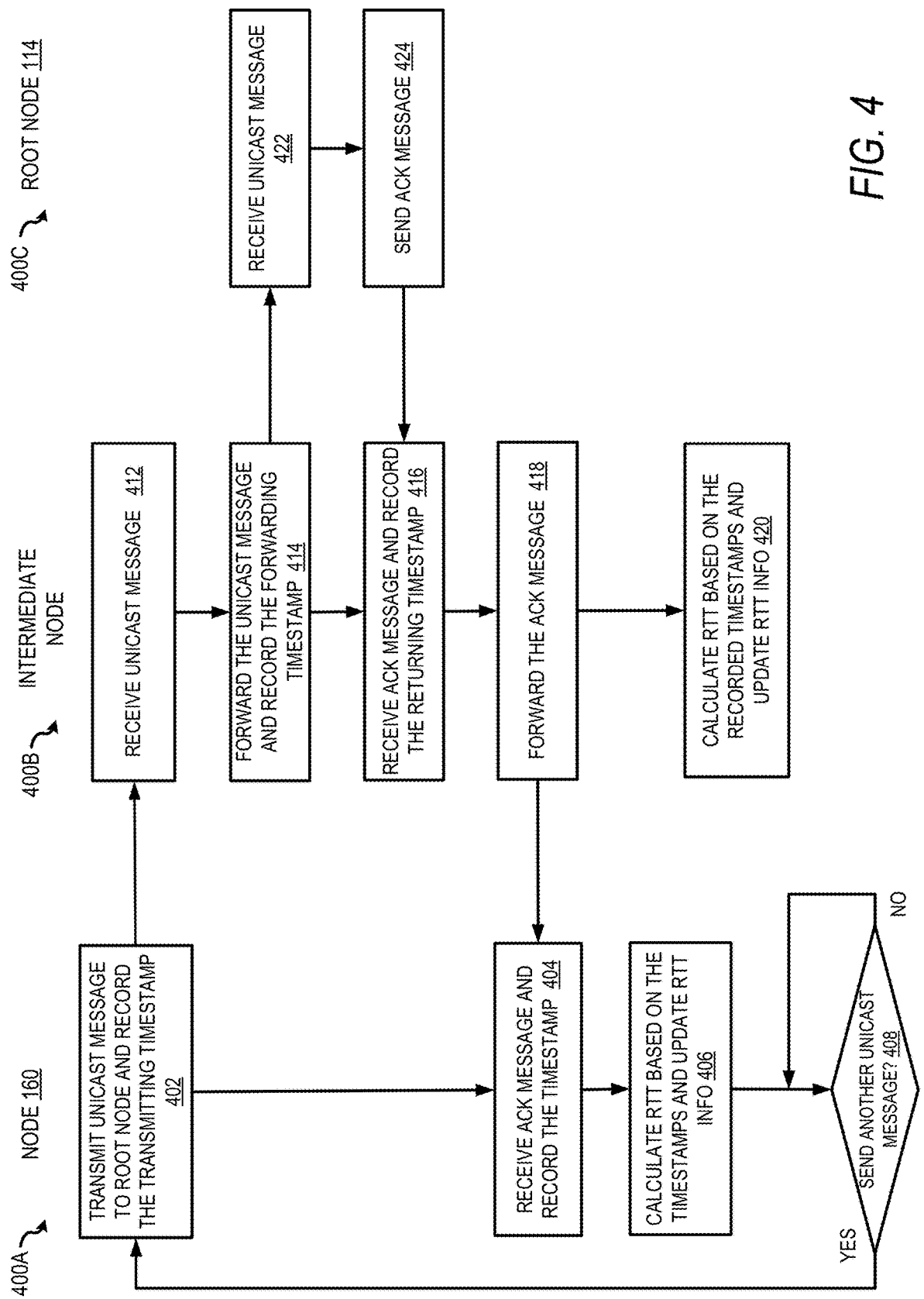
FIG. 4 shows examples of processes for calculating RTTs by nodes along a route from a child node to a root node in a mesh network, according to certain aspects of the disclosure.

Referring now to FIG. 4, FIG. 4 includes several flow diagrams that illustrate several processes 400A, 400B, and 400C for calculating RTTs by various nodes 106 in the mesh network 104, according to certain aspects of the disclosure. In particular, the process 400A illustrates aspects of a node 160 configured for transmitting messages to the root node 114 via a parent node. The process 400B illustrates aspects of an intermediate node on the route from the node 160 to the root node 114. The process 400C illustrates aspects of the root node 114. The node 160, the intermediate node, and the root node 114 can implement operations in process 400A, 400B, and 400C, respectively by executing suitable program code. The processes 400A, 400B, and 400C will be described together below. For illustrative purposes, the processes 400A, 400B, and 400C are described with reference to certain examples depicted in the figures. Other implementations, however, are possible.

At block 402, the process 400A involves a node 160 transmitting a unicast message 212 to the root node 114 through one of its parent nodes. The unicast message can be any message sent from the child node E to the root node 114 that requires the root node to respond back. For example, the unicast message can be a ping message to the root node 114. If the mesh network 140 is configured to implement the RPL protocol, the unicast message can include a DAO message that is used to propagate destination information upward along the mesh network 140. In some examples, the node 160 generates and inserts a sequence number in the unicast message, such as in the header of the unicast message as discussed above. The sequence number can uniquely identify the unicast message transmitted by the node 160. The node 160 further records the timestamp for transmitting the unicast message.

At block 412, the process 400B involves an intermediate node, such as the parent node or any other node on the route from the node 160 to the root node 114, receiving the unicast message 212 sent from the node 160. The intermediate node can record the sequence number of the unicast message along with an identifier of the node 160, such as the IP address of the identifier. The combination of the identifier of the node 160 and the sequence number of the unicast message can uniquely identify the unicast message on the mesh network 140. At block 414, the process 400B involves the intermediate node forwarding the received unicast message to the next node on the route. The intermediate node also records the timestamp for forwarding the unicast message and stores the timestamp along with the sequence number and the node identifier.

At block 422, the process 400C involves the root node 114 receiving the unicast message. At block 424, the process 400C involves the root node 114 transmitting the acknowledgement message 214 back to the node 160 along the same route. In some examples, the root node 114 transmits the acknowledgement message using the source routing header which contains the sequence number of the unicast message and the identifier of the node 160.

At block 416, the process 400B involves the intermediate node receiving the acknowledgement message sent from the root node 114 and recording the timestamp for receiving the acknowledgement message. The intermediate node can further extract the sequence number and the identifier of the node 160 from the acknowledgement message. At block 418, the process 400B involves forwarding the acknowledgement message to the node 160 along the same route back to the node 160.

At block 420, the intermediate node calculates the RTT for a portion of the route from the intermediate node to the root node 114. To do so, the intermediate node can compare the sequence number and node identifier extracted from the acknowledgement message with the sequence numbers and node identifiers previously recorded. If there is a match, the intermediate node retrieves the forwarding timestamp associated with the sequence number and node identifier. The intermediate node computes the difference between the time specified by the forwarding timestamp and the timestamp of receiving the acknowledgement message. This difference indicates the RTT of the route from the intermediate node to the root node 114.

The intermediate node can use the computed RTT to update the RTT information for this route. For example, the intermediate node can use the newly computed RTT to replace the old RTT stored for this route. Alternatively, the intermediate node can calculate an averaged RTT obtained over a past time period as the RTT for this route. Other ways of calculating the RTT for the route can be used to update the RTT information.

At block 404, the process 400A involves the node 160 receiving the acknowledgement message forwarded by the intermediate nodes including its parent node. The node 160 further records the timestamp of receiving the acknowledgement message and extracts the sequence number of the unicast message from the acknowledgement message. At block 406, the node 160 calculates the RTT for the route used to send the unicast message to the root node 114 based on the recorded timestamps. For example, the node 160 can compare the sequence number extracted from the acknowledgement message with the sequence numbers it previously recorded. If there is a match, the node 160 retrieves the timestamp for transmitting the unicast message containing the sequence number. The node 160 can compute the difference between the time specified by the transmitting timestamp and the timestamp of receiving the acknowledgement message. This difference indicates the RTT of the route from the node 160 to the root node 114 via the parent node.

The node 160 can use the computed RTT to update the RTT information for this route. For example, the node 160 can use the newly computed RTT to replace the old RTT stored for this route. Alternatively, the node 160 can calculate an averaged RTT obtained over a past time period as the RTT for this route. Other ways for updating the RTT based on recently computed RTT can be utilized. At block 408, the node 160 determines whether another unicast message should be sent to the root node 114. For example, the node 160 can set up a schedule for sending unicast messages to the root node 114 for updating RTT information. The node 160 can determine that another unicast message should be sent to the root node 114 if the scheduled time is up. In examples where the unicast messages include a DAO message, the node 160 can determine that another DAO message needs to be sent according to the RPL protocol. If the node 160 determines that another unicast message should be sent to the root node 114, the node 160 can start the process 400A again from block 402 for the new unicast message.

The processes shown in FIG. 4 are used to calculate the RTT for one route associated with one parent node of the node 160. Similar processes can be carried out for each parent node of the node 160 to obtain the RTTs of the respective routes. The intermediate nodes along those routes can calculate their respective RTTs to the root node 114 based on forwarding the unicast message and receiving the acknowledgement message by following processes similar to process 400B.

Figure 5:
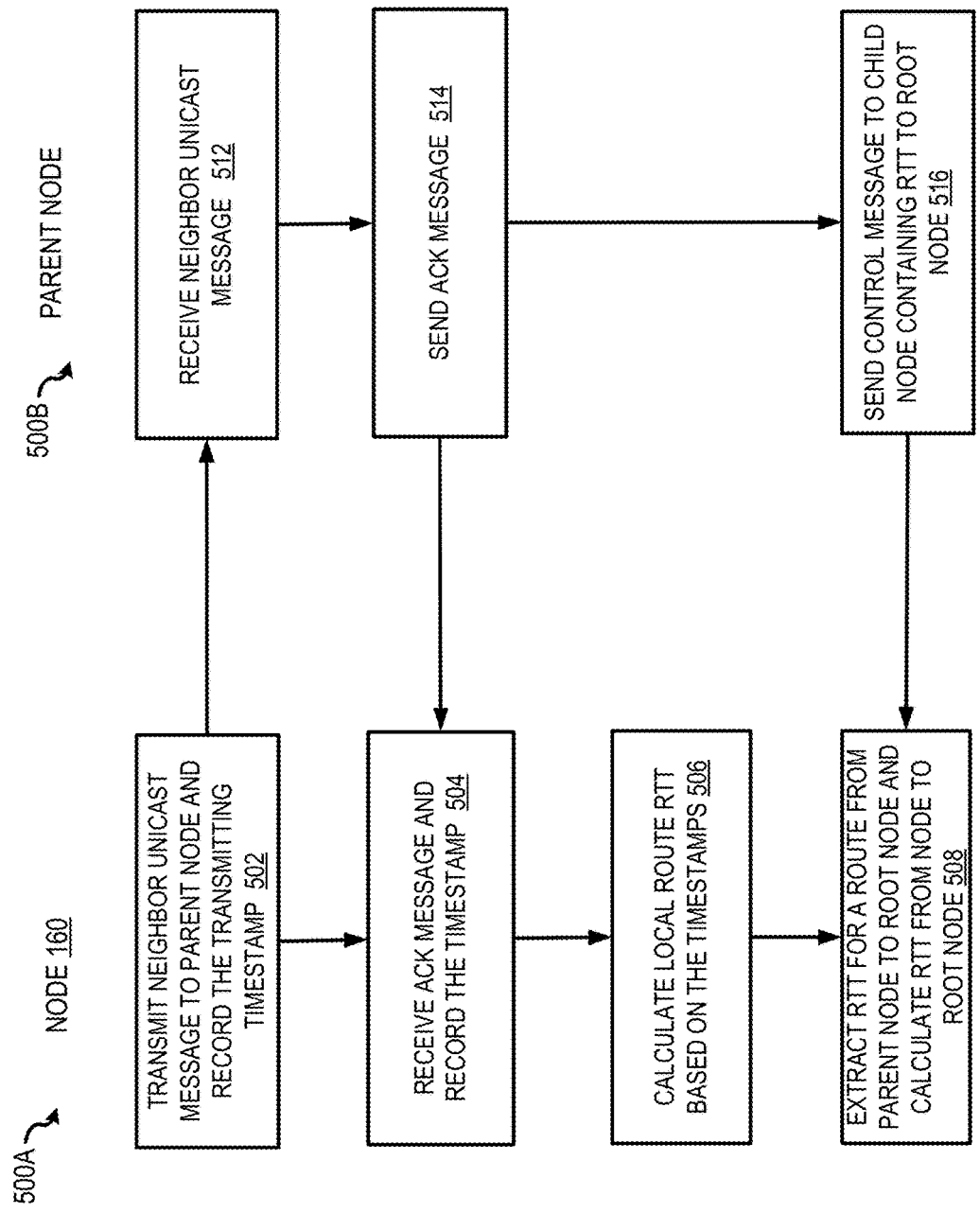
FIG. 5 shows examples of processes for calculating RTT for routes from a child node to a root node in a mesh network, according to certain aspects of the disclosure.

FIG. 5 includes several flow diagrams that illustrate several processes 500A and 500B for calculating the RTT for a route from a node 160 to the root node 114 in a mesh network 140, according to certain aspects of the disclosure. In particular, the process 500A illustrates aspects of a node 160 configured for transmitting messages to the root node 114 via a parent node. The process 500B illustrates aspects of the parent node. The node 160 and the parent node can implement operations in process 500A and 500B respectively by executing suitable program code. The processes 500A and 500B will be described together below. For illustrative purposes, the processes 500A and 500B are described with reference to certain examples depicted in the figures. Other implementations, however, are possible.

At block 502, the process 500A involves a node 160 transmitting a neighbor unicast message 232 to its parent node as described above in detail with respect to FIG. 2B. The node 160 further records the timestamp for transmitting the neighbor unicast message 232. At block 512, the process 500B involves the parent node receiving the neighbor unicast message 232 from the node 160. At block 514, the parent node sends an acknowledgement message to the neighbor unicast message 232 back to the node 160. At block 504, the process 500A involves the node 160 receiving the acknowledgement message and recording the timestamp for receiving the acknowledgement message. As discussed above with respect to FIG. 2B, the timestamp for receiving the acknowledgement message is recorded to include all the MAC layer retries if the neighbor unicast message 232 is a MAC layer message or the time of receiving the IP reply if the neighbor unicast message 232 is an IP message.

At block 506, the node 160 calculates the RTT for the local route from the node 160 to the parent node based on the timestamp recorded when transmitting the neighbor unicast message 232 and the timestamp recorded when receiving the acknowledgement message. The node 160 can calculate the RTT for the local route to be the difference between the time specified in the two timestamps.

At block 516, the process 500B involves the parent node sending a control message 252 to the node. As discussed in detail above with respect to FIG. 2B, the control message 252 can include the RTT for a route from the parent node to the root node 114 through a primary parent node of the parent node (i.e., the primary route of the parent node). At block 508, the node 160 receives the control message 252 and extracts the RTT of the primary route of the parent node to the root node 114 from the control message 252. The node 160 further calculates the RTT for the route to the root node 114 via the parent node to be the sum of the RTT of the local route calculated at block 506 and the RTT extracted from the control message 252.

The processes shown in FIG. 5 are used to calculate the RTT for one route associated with one parent node of the node 160. Similar processes can be carried out for other parent nodes of the node 160 to obtain the RTTs of the respective routes. Further, while the operations of the nodes shown in FIG. 5 are described in a certain order, these operations can be performed in a different order than described above and fewer or more operations can be involved. For example, the parent node may send the control message 252 to the child node 160 before receiving the neighbor unicast message 232 from the child node 160. Accordingly, extracting the RTT contained in the control message 252 can be performed by the child node 160 before transmitting the neighbor unicast message 232. In further examples, the parent node may send its RTT information to the child node 160 through the control message 252 more frequently than the child node 160 initiating the local RTT estimation through the neighbor unicast message 232, or vice versa.

While the above descriptions describe the processes in FIGS. 4 and 5 separately, the nodes in the mesh network can implement both processes to estimate the RTT of different routes. The RTTs estimated by these two processes for a same route can be combined through any means. For example, a node can average the RTTs obtained through these two processes to determine the RTT for a route. The node can also use weighted summation of the RTTs obtained from the two processes. In another example, the node can select the RTT obtained through one of the processes over the other process because the selected RTT is more recent, more accurate, or for other reasons.

Exemplary Node

Figure 6:
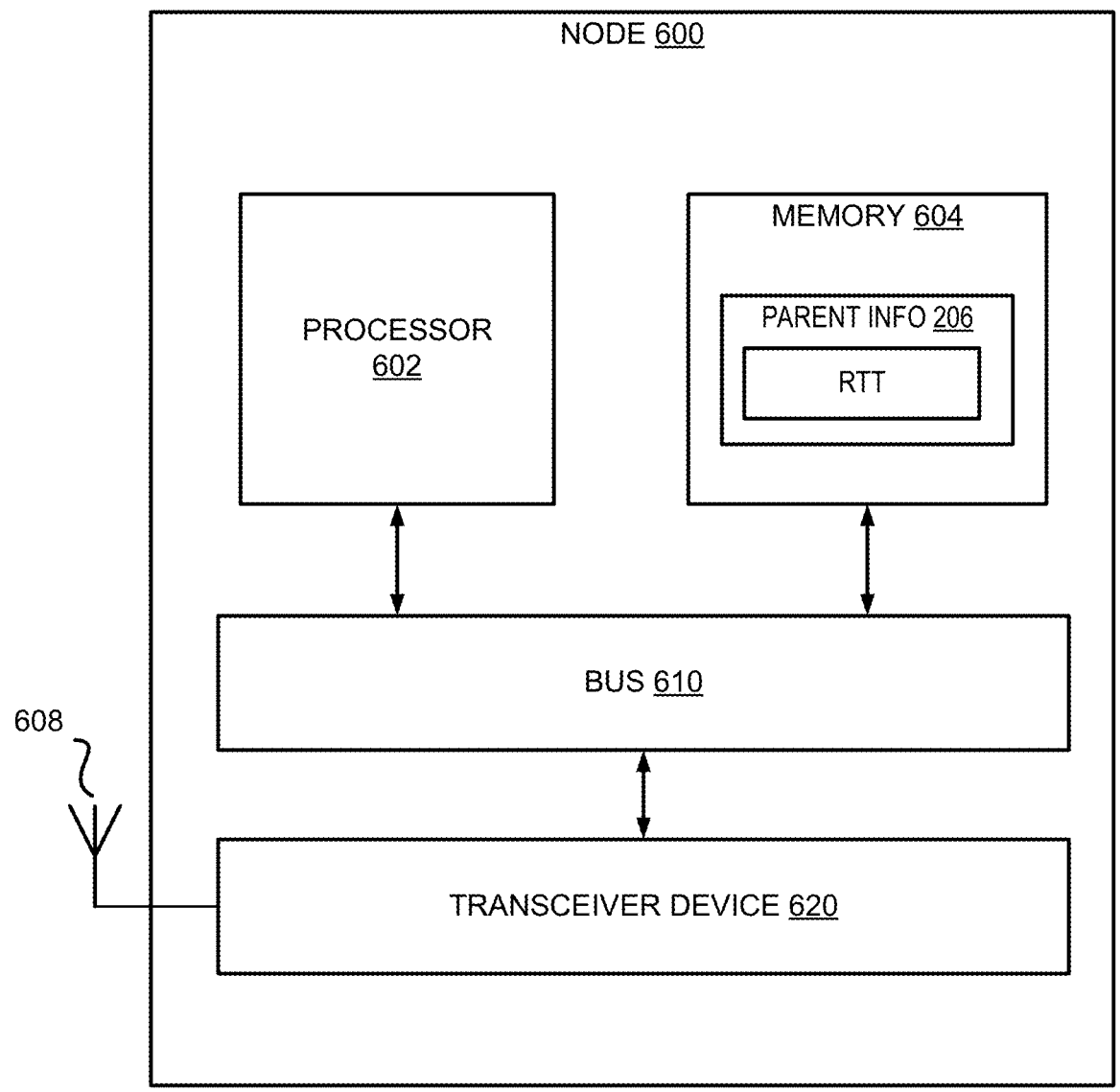
FIG. 6 is a block diagram depicting an example of a node suitable for implementing aspects of the techniques and technologies presented herein.

FIG. 6 illustrates an exemplary node 600 that can be employed to implement the route optimization for time-critical messages described herein, such as a node 160. The node 600 may include a processor 602, memory 604, and a transceiver device 620 each communicatively coupled via a bus 610. The components of node 600 can be powered by an A/C power supply or a low energy source, such as a battery (not shown). The transceiver device 620 can include (or be communicatively coupled to) an antenna 608 for communicating with other nodes. In some examples, the transceiver device is a radio-frequency ("RF") transceiver for wirelessly transmitting and receiving signals.

The processor may include a microprocessor, an application-specific integrated circuit ("ASIC"), a state machine, a field programmable gate array ("FPGA") or other suitable computing device. The processor can include any number of computing devices and can be communicatively coupled to a computer-readable media, such as memory 604. The processor 602 can execute computer-executable program instructions or access information stored in memory to perform operations, such as the operations described in FIGS. 3-5. The instructions may comprise processor-specific instructions generated by a compiler and/or an interpreter from code written in any suitable computer-programming language. When instructions are executed, they may configure the node 600 to perform any of the operations described herein. The memory 604 may also be configured to store information such as the parent information 206 including the calculated RTT for routes associated with different parent nodes. Although the processor, memory, bus, and transceiver device are depicted in FIG. 6 as separate components in communication with one another, other implementations are possible. The systems and components discussed herein are not limited to any particular hardware architecture or configuration.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A mesh network, comprising:
a root node;
a child node in communication with the root node through other nodes in the mesh network; and
a plurality of parent nodes of the child node, each parent node in the plurality of parent nodes is associated with a route between the child node and the root node that passes through the parent node, the plurality of parent nodes comprising a primary parent node and one or more backup parent nodes;
wherein the child node is configured for:
transmitting regular data to the root node through a primary route associated with the primary parent node;
determining that there is a time-critical message to be transmitted to the root node, wherein the time-critical message is to be delivered to the root node faster than the regular data;
selecting a subset of parent nodes of said plurality of parent nodes according to a route reliability criteria;
estimating a round trip time (RTT) for each route between the child node and the root node that is associated with one parent node of the selected subset of parent nodes, wherein the RTTs are estimated based on messages transmitted between the child node and each parent node of the selected subset of parent nodes;
selecting, among the selected subset of parent nodes, a parent node whose associated route has the lowest RTT and is different from the primary route associated with the primary parent node;
transmitting the time-critical message to the root node through the selected parent node; and
after transmitting the time-critical message to the root node through the selected parent node, transmitting additional regular data to the root node through the primary route.

2. The mesh network of claim 1, wherein estimating the RTT for a route between the child node and the root node that is associated with one parent node of the selected subset of parent nodes comprises:
transmitting a unicast message to the root node through the one parent node;
recording a first timestamp associated with the transmitting of the unicast message;
receiving an acknowledgement message of the unicast message from the root node;
recording a second timestamp associated with receiving the acknowledgement message; and
calculating the RTT for the route between the child node and the root node that is associated with the one parent node as a difference between a second time point indicated by the second timestamp and a first time point indicated by the first timestamp.

3. The mesh network of claim 2, wherein the one parent node is configured for:
receiving the unicast message from the child node;
forwarding the unicast message to the root node through a route between the one parent node and the root node;
recording a third timestamp associated with forwarding the unicast message by the one parent node;
receiving the acknowledgement message of the unicast message from the root node;
recording a fourth timestamp associated with receiving the acknowledgement message at the one parent node;
forwarding the acknowledgement message of the unicast message to the child node; and
calculating an RTT for the route between the one parent node and the root node as a difference between a fourth time point indicated by the fourth timestamp and a third time point indicated by the third timestamp.

4. The mesh network of claim 3, wherein the mesh network implements a routing protocol of lossy medium (RPL) and the unicast message is a destination advertisement object (DAO) message.

5. The mesh network of claim 4, wherein:
the DAO message comprises a sequence number;

the acknowledgement message of the DAO message comprises the sequence number; and the one parent node is configured to identify the third timestamp and the fourth timestamp based on the sequence number contained in the DAO message and the sequence number contained in the acknowledgement message, respectively.

6. The mesh network of claim 5, wherein the sequence number is comprised in a new IPv6 extension header or a hop-by-hop (HBH) option of an existing IPv6 header.

7. The mesh network of claim 1, wherein estimating the RTT for a route between the child node to the root node that is associated with one parent node of the selected subset of parent nodes comprises:
transmitting a neighbor unicast message to the one parent node;
recording a first timestamp associated with the transmitting of the neighbor unicast message;
receiving an acknowledgement of the neighbor unicast message from the one parent node;
recording a second timestamp associated with the receiving of the acknowledgement;
calculating a local RTT for a local route between the child node and the one parent node as a difference between a second time point indicated by the second timestamp and a first time point indicated by the first timestamp;
receiving a control message from the one parent node, the control message specifying an RTT of a route between the one parent node and the root node; and
calculating the RTT for the route between the child node and the root node that is associated with the one parent node as a sum of the local RTT and the RTT of the route between the one parent node and the root node.

8. The mesh network of claim 7, wherein the mesh network implements a routing protocol of lossy medium (RPL) and the control message is a DODAG information object (DIO) message, wherein the control message specifies the RTT of the route between the one parent node and the root node in an option of the DIO message.

9. The mesh network of claim 7, wherein the RTT of the route between the one parent node and the root node is an RTT of a route between the one parent node and the root node associated with a primary parent node of the one parent node.

10. The mesh network of claim 7, wherein the RTT of a route between the one parent node and the root node specified in the control message is a latest RTT or an averaged RTT calculated by the one parent node.

11. The mesh network of claim 1, wherein each of the child node and the selected subset of parent nodes is configured for maintaining the RTT for routes from the corresponding node to the root node.

12. A node of a network, comprising:
a processor configured to execute computer-readable instructions; and
a memory configured to store the computer-readable instructions that, when executed by the processor, cause the processor to perform operations comprising:
transmitting regular data to a root node of the network through a primary route associated with a primary parent node of the node, wherein the node has a plurality of parent nodes in the network comprising the primary parent node and one or more backup parent nodes, each of the plurality of parent nodes associated with a route between the node and the root node of the network;
determining that there is a time-critical message to be transmitted to the root node, wherein the time-critical message is to be delivered to the root node faster than the regular data;
selecting a subset of parent nodes of said plurality of parent nodes according to a route reliability criteria;
estimating a round trip time (RTT) for each route between the node to the root node that is associated with one parent node of the selected subset of plurality of parent nodes, wherein the RTTs are estimated based on messages transmitted between the node and each parent node of the selected subset of plurality of parent nodes;
selecting, among the selected subset of plurality of parent nodes, a parent node whose associated route has the lowest RTT and is different from the primary route associated with the primary parent node;
transmitting the time-critical message to the root node through the selected parent node; and
switching back to the primary route to transmit additional regular data to the root node.

13. The node of claim 12, wherein estimating the RTT for a route between the node and the root node that is associated with one parent node of the selected subset of plurality of parent nodes comprises:
transmitting a unicast message to the root node through the one parent node;
recording a first timestamp associated with the transmitting of the unicast message;
receiving an acknowledgement message of the unicast message from the root node;
recording a second timestamp associated with receiving the acknowledgement message; and
calculating the RTT for the route between the node and the root node that is associated with the one parent node as a difference between a second time point indicated by the second timestamp and a first time point indicated by the first timestamp.

14. The node of claim 13, wherein the one parent node is configured for:
receiving the unicast message from the node;
forwarding the unicast message to the root node through a route between the one parent node and the root node;
recording a third timestamp associated with forwarding the unicast message by the one parent node;
receiving the acknowledgement message of the unicast message from the root node;
recording a fourth timestamp associated with receiving the acknowledgement message at the one parent node;
forwarding the acknowledgement message of the unicast message to the node; and
calculating an RTT for the route between the one parent node and the root node as a difference between a fourth time point indicated by the fourth timestamp and a third time point indicated by the third timestamp.

15. The node of claim 12, wherein estimating the RTT for a route between the node to the root node that is associated with one parent node of the selected subset of plurality of parent nodes comprises:
transmitting a neighbor unicast message to the one parent node;
recording a first timestamp associated with the transmitting of the neighbor unicast message;
receiving an acknowledgement of the neighbor unicast message from the one parent node;
recording a second timestamp associated with the receiving of the acknowledgement;

calculating a local RTT for a local route between the node and the one parent node as a difference between a second time point indicated by the second timestamp and a first time point indicated by the first timestamp;

receiving a control message from the one parent node, the control message specifying an RTT of a route between the one parent node and the root node; and calculating the RTT for the route between the node and the root node that is associated with the one parent node as a sum of the local RTT and the RTT of the route between the one parent node and the root node.

16. A method for transmitting time-critical messages in a mesh network, the method comprising:

transmitting, by a node in the mesh network, regular data to a root node of the mesh network through a primary route associated with a primary parent node of the node, wherein the node has a plurality of parent nodes in the mesh network comprising the primary parent node and one or more backup parent nodes, each of the plurality of parent nodes associated with a route between the node and the root node of the mesh network;

determining, by the node, that there is a time-critical message to be transmitted to the root node, wherein the time-critical message is to be delivered to the root node faster than the regular data;

selecting a plurality of parent nodes of said plurality of parent nodes according to a route reliability criteria;

estimating, by the node, a round trip time (RTT) for each route between the node to the root node that is associated with one parent node of the selected subset of plurality of parent nodes, wherein the RTTs are estimated based on messages transmitted between the node and each parent node of the selected subset of plurality of parent nodes;

selecting, by the node and among the selected subset of plurality of parent nodes, a parent node whose associated route has the lowest RTT and is different from the primary route associated with the primary parent node;

transmitting, by the node, the time-critical message to the root node through the selected parent node; and switching, by the node, back to the primary route to transmit additional regular data to the root node.

17. The method of claim 16, wherein estimating the RTT for a route between the node and the root node that is associated with one parent node of the selected subset of plurality of parent nodes comprises:

transmitting a unicast message to the root node through the one parent node;

recording a first timestamp associated with the transmitting of the unicast message;

receiving an acknowledgement message of the unicast message from the root node;

recording a second timestamp associated with receiving the acknowledgement message; and calculating the RTT for the route between the node and the root node that is associated with the one parent node as a difference between a second time point indicated by the second timestamp and a first time point indicated by the first timestamp.

18. The method of claim 17, wherein the mesh network implements a routing protocol of lossy medium (RPL) and the unicast message is a destination advertisement object (DAO) message.

19. The method of claim 16, wherein estimating the RTT for a route between the node to the root node that is associated with one parent node of the selected subset of plurality of parent nodes comprises:

transmitting a neighbor unicast message to the one parent node;

recording a first timestamp associated with the transmitting of the neighbor unicast message;

receiving an acknowledgement of the neighbor unicast message from the one parent node;

recording a second timestamp associated with the receiving of the acknowledgement;

calculating a local RTT for a local route between the node and the one parent node as a difference between a second time point indicated by the second timestamp and a first time point indicated by the first timestamp;

receiving a control message from the one parent node, the control message specifying an RTT of a route between the one parent node and the root node; and calculating the RTT for the route between the node and the root node that is associated with the one parent node as a sum of the local RTT and the RTT of the route between the one parent node and the root node.

* * * * *